(12) United States Patent
Rumbel et al.

(10) Patent No.: US 9,835,098 B2
(45) Date of Patent: *Dec. 5, 2017

(54) SYSTEM AND METHOD OF INJECTING NATURAL GAS IN LIQUID FORM INTO A DIESEL ENGINE

(71) Applicant: Keith Murray Rumbel, Dungog (AU)

(72) Inventors: Keith Murray Rumbel, Dungog (AU); Derek Robert Watkins, Dungog (AU)

(73) Assignee: DGT IP HOLDINGS PTY LTD, New South Wales (AU)

( * ) Notice: Subject to any disclaimer, the term of this patent is extended or adjusted under 35 U.S.C. 154(b) by 235 days.

This patent is subject to a terminal disclaimer.

(21) Appl. No.: 14/715,401

(22) Filed: May 18, 2015

(65) Prior Publication Data

US 2015/0247470 A1 Sep. 3, 2015

Related U.S. Application Data

(63) Continuation-in-part of application No. 12/821,854, filed on Jun. 23, 2010, now Pat. No. 9,057,344.

(30) Foreign Application Priority Data

Jun. 23, 2009 (AU) ................ 2009902887

(51) Int. Cl.
*F02D 19/06* (2006.01)
*F02D 19/10* (2006.01)
(Continued)

(52) U.S. Cl.
CPC ....... *F02D 19/0647* (2013.01); *F02D 19/061* (2013.01); *F02D 19/0631* (2013.01); *F02D 19/081* (2013.01); *F02D 19/10* (2013.01); *F02D 41/0025* (2013.01); *F02D 41/0027* (2013.01); *F02M 21/0287* (2013.01); *F02B 3/06* (2013.01); *F02D 19/0689* (2013.01); *F02D 41/187* (2013.01); *F02D 2200/0402* (2013.01);
(Continued)

(58) Field of Classification Search
CPC ............ F02D 19/0647; F02D 41/0025; F02D 41/0027; F02D 19/061; F02D 19/081; F02D 19/10; F02D 19/0631; F02D 2200/0406; F02D 41/187; F02D 2200/0402; F02D 2200/0404; F02M 21/0287; F02B 3/06
See application file for complete search history.

(56) References Cited

U.S. PATENT DOCUMENTS 4,606,322 A 8/1986 Reid et al.
5,293,851 A * 3/1994 Schaub ................. F02B 19/08
123/256

(Continued)

*Primary Examiner* — Joseph Dallo
(74) *Attorney, Agent, or Firm* — Pillsbury Winthrop Shaw Pittman, LLP

(57) ABSTRACT

The present invention discloses a method of introducing fuel into a diesel engine for combustion within the engine. A natural gas in liquid form is injected into the engine for combustion therein with diesel fuel so as to maintain a natural gas concentration derived from the liquid in the range of greater than 0.6% to 3.0% of air intake by volume of natural gas. Suitable gases include natural gas, methane or substantially methane gas mixtures and substitute natural gas such as propane air mixtures providing a mixture with similar combustion properties to methane/natural gas.

20 Claims, 2 Drawing Sheets

(51) Int. Cl.
  *F02M 21/02*   (2006.01)
  *F02D 19/08*   (2006.01)
  *F02D 41/00*   (2006.01)
  F02B 3/06      (2006.01)
  F02D 41/18     (2006.01)

(52) U.S. Cl.
  CPC ............... *F02D 2200/0404* (2013.01); *F02D 2200/0406* (2013.01); *Y02T 10/32* (2013.01); *Y02T 10/36* (2013.01)

(56) References Cited

U.S. PATENT DOCUMENTS

| | | |
|---|---|---|
| 5,673,673 A | 10/1997 | Beck |
| 5,887,567 A | 3/1999 | White et al. |
| 5,887,574 A | 3/1999 | Smith |
| 6,067,972 A | 5/2000 | Jaasma |
| 6,237,575 B1 | 5/2001 | Lampert et al. |
| 7,000,573 B2 | 2/2006 | Kruger |
| 7,100,577 B2 | 9/2006 | Mumford et al. |
| 7,463,967 B2 | 12/2008 | Ancimer et al. |
| 7,621,469 B2 | 11/2009 | Hornby |
| 8,214,128 B2 | 7/2012 | Watkins et al. |
| 8,322,325 B2 * | 12/2012 | Rogak ................ F02D 19/0647 123/304 |
| 2005/0121005 A1 | 6/2005 | Edwards |
| 2005/0205021 A1 | 9/2005 | Shute |
| 2005/0284451 A1 | 12/2005 | Uhde et al. |
| 2007/0157912 A1 | 7/2007 | Ritter et al. |
| 2010/0199948 A1 * | 8/2010 | Rogak ................ F02D 19/0647 123/304 |

* cited by examiner

SYSTEM AND METHOD OF INJECTING NATURAL GAS IN LIQUID FORM INTO A DIESEL ENGINE

CROSS REFERENCE TO RELATED APPLICATION

U.S. patent application Ser. No. 12/821,854 lodged 23 Jun. 2010 is incorporated herein by reference to its entirety as if fully set forth.

FIELD OF THE INVENTION

The invention relates to diesel fuel engines and, in particular, to a method and system for injecting combustible gas in liquid form into a diesel fuel engine for combustion therein.

The invention has been developed primarily with respect to conventional diesel fuel engines and will be described hereinafter with reference to this application. However, it will be appreciated that the invention is not limited to this particular field of use and is also applicable to bio-diesel fuel engines, for example.

BACKGROUND ART

Diesel fuel engines have been used widely in a large array of applications such as transport, heavy machinery or power generation and form a significant component of much equipment in agriculture, mining, construction, and freight and passenger transport for many years. It is known that a combustible gas can be added to a diesel fuel engine air intake. The mixture of the combustible gas with the conventional air intake enhances combustion conditions within the cylinder so as to increase efficiency of the diesel fuel combustion process.

Typically in the prior art, a combustible gas source, for example LPG gas (liquid petroleum gas), is connected to an air inlet of a diesel fuel engine and injected by means of a solenoid valve, at some predetermined rate. This is drawn into the engine air intake stream and mixed in a venturi. The suction of the venturi is provided by the manifold vacuum or pressure difference.

Unfortunately, simple factors in engine performance deterioration significantly reduce the efficiency of the combustible gas injection and hence engine combustion. As a result, the level of the combustible gas injected is not decreased proportionally and this disadvantageously starts to decrease in any delivered efficiency gains and, depending on the deterioration of engine components such as the air filter, can cause the engine to operate inefficiently by providing conditions in which the engine efficiency is lower with a gas injection than without.

Others have recognised these problems and attempted to address them. In one solution, there is provided a method and system of injecting a low concentration of combustible gas into the air intake of a diesel fuel engine. This advantageously significantly increases the combustion efficiency of diesel fuel thereby providing an increase in engine power. This also significantly reduces emissions, especially particulate matter.

With such a significant improvement in combustion efficiency, use of this system has the limitation, especially in naturally aspirated diesel engines, that the engine cannot draw in sufficient air to efficiently combust an increase in diesel fuel. This limitation is the result of engine manufacture and design which is configured to combust the diesel fuel relatively inefficiently compared with an engine operating the abovementioned method and system. In the case of turbo charged engines, it is understood that turbo boost pressure, and hence air in-take volumes, can only be increased so far without risking damage to the turbo charger. In other words, use of this system and method can cause the diesel engine to run out of or draw insufficient air to burn additional fuel so that the full benefits of the system are provided.

GENESIS OF THE INVENTION

The genesis of the present invention is a desire to provide an improved method and system of injecting methane, natural gas or substitute natural gas into a diesel fuel engine for combustion with diesel fuel therein, or to provide a useful alternative.

SUMMARY OF THE INVENTION

According to a first aspect of the present invention there is provided a method of injecting natural gas in liquid form into a diesel fuel engine for combustion with diesel fuel therein, said method comprising:
  injecting said natural gas in liquid form into said engine for combustion therein with said diesel fuel so as to maintain a natural gas concentration in one or more cylinders of said engine prior to combustion,
  said natural gas concentration being maintained in the range of greater than 0.6% to 3.0% of air intake by volume of said natural gas.

According to another aspect of the invention there is provided a system for Injecting natural gas in liquid form into a diesel fuel engine for combustion with diesel fuel therein, said system comprising:
  a natural gas injection device having an outlet disposed in fluid communication with said engine and an inlet disposed in fluid communication with a liquid natural gas source;
  a natural gas injection device controller configured to receive input indicative of an engine performance parameter and configured to control the rate of injection of said natural gas in liquid form from said natural gas injection device outlet such that said natural gas is present in one or more cylinders of said engine prior to combustion in the amount greater than 0.6% to 3.0% of air intake by volume of said natural gas.

It can be seen there is advantageously provided a method and system of injecting natural gas in liquid form into a diesel fuel engine that improves combustion of diesel fuel in the engine so as to decrease the emissions and increase power from the diesel engines. The method and system of injection of natural gas in liquid form advantageously provides a pressure reduction after injection that allows more air to be mixed with fuel in the cylinder allowing the combustion of more fuel from the same engine configuration.

BRIEF DESCRIPTION OF THE DRAWINGS

Preferred embodiments of the invention will now be described, by way of example only, with reference to the accompanying drawings in which.

DETAILED DESCRIPTION

Figure 1:
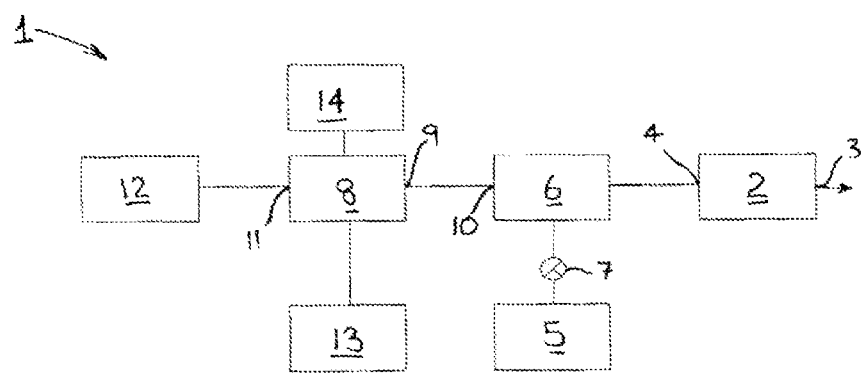
FIG. 1 is a block diagram of a system for injecting natural gas in liquid form into a diesel fuel engine for combustion with diesel fuel therein according to a first preferred embodiment of the invention.

Referring to the drawings generally, it will be appreciated that like reference numerals have been used to denote like components. In FIG. 1, there is shown a system 1 for injecting a natural gas in liquid form into a diesel fuel engine for combustion with diesel fuel therein. The diesel fuel engine is not illustrated. It will be understood that the term natural gas refers to a substantially methane containing gas and includes synthetically produced natural gas or methane, as well as substitute gas mixtures that provide substantially the same combustion characteristics as natural gas/methane.

An example of a substitute natural gas is formed from a mixture of approximately 60% propane and 40% air or from a mixture of propane, butane and air such as is available from Alternative Energy Systems Inc, Peachtree City, Ga. (www.altenergy.com). However it will be understood that any combustible gas mixture having the combustion characteristics of methane/natural gas can be used as desired.

The system 1 includes a natural gas injection device 2 having an outlet 3 disposed in fluid communication with the diesel fuel engine (not illustrated) so as to inject the natural gas for combustion in the engine. The injection device 2 includes an inlet 4 in fluid communication with a liquid natural gas source 5 with a natural gas flow controller 6 disposed intermediate. An isolation valve 7 is disposed intermediate the liquid natural gas source 5 and the flow controller 6.

A natural gas injection device controller 8 includes an output 9 in communication with a signal input 10 of the flow controller 6. The signal received by the input 10 of the flow controller 6 controls the flow of liquid natural gas from the source 5 through the injection device 2 and the outlet 4 into the engine. The controller 8 includes an input 11 in communication with a sensor 12 configured to provide an input to the controller 8 indicative of an engine performance parameter. The controller 8 is configured to receive the data indicative of the engine performance parameter from the sensor 12 and control the rate of injection of the liquid natural gas through the injection device 2 via the flow controller 6. The controller 8 is configured to operate the flow controller 6 to allow the predetermined flow of liquid natural gas in liquid form from the injection device outlet 3 such that the natural gas is present in one or more cylinders of the engine (not illustrated) prior to combustion in the amount greater than 0.6% to 3.0% of the air intake by volume of the natural gas. Most preferably, the natural gas concentration in one or more of the engine cylinders prior to combustion is about 2.3%.

A transceiver device 13, or communications interface, is disposed in communication with the controller 8 to allow communication between the controller 8 and a remote device. The natural gas injected in liquid form into the engine is most preferably methane or substitute natural gas.

The input received by the controller 8 from the sensor 12 can be indicative of any preferred engine performance parameter such as a measured percentage of natural gas mixed in with the air intake stream prior to combustion or injection into the engine cylinders, engine revolutions per minute (RPM) from a voltage output of the alternator of the diesel fuel engine or other engine electrical source, the engine manifold absolute pressure, turbo charge of pressure in turbo charged engines, throttle position, exhaust temperature, exhaust nitrous oxide gas concentration, or an engine dynameter.

It will be appreciated that in use the system 1 injects a natural gas into the diesel engine for combustion with the diesel fuel therein from the injection device outlet 3 such that the natural gas is injected in liquid form. This advantageously provides a surprisingly significant pressure reduction in the environment surrounding the liquid gas injection as the liquid vaporises and hence reduces the temperature upon injection. The liquid natural gas mixes with air from the diesel engine air intake stream (not illustrated) so as to provide a natural gas concentration of greater than 0.6% to 2.3%. So far as injection of the liquid natural gas reduces the pressure upon injection, additional air can be fed into the engine for relatively efficient combustion with diesel fuel therein.

Figure 2:
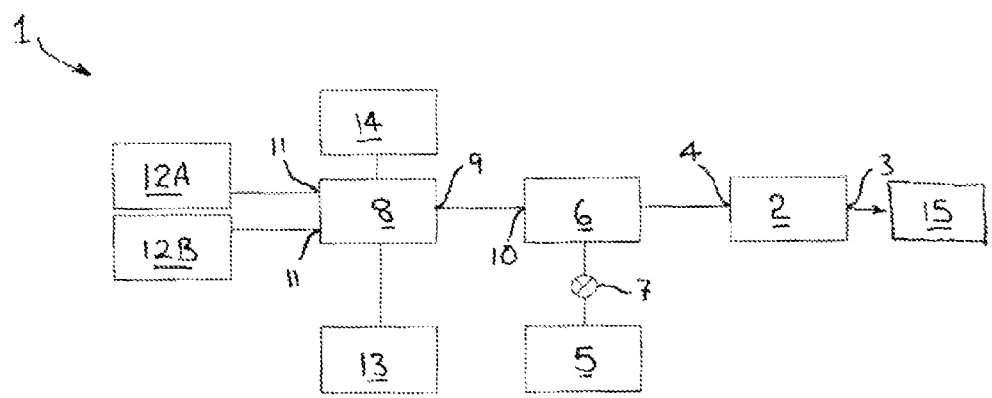
FIG. 2 is a is a block diagram of a system for injecting natural gas in liquid form into the cylinders of a diesel fuel engine for combustion with diesel fuel therein according to a second preferred embodiment of the invention.

Referring now to FIG. 2, there is shown a schematic block diagram of a system 1 for injecting natural gas in liquid form to the engine manifold or air intake steam (not illustrated) of a diesel fuel engine (not illustrated) for combustion with diesel fuel therein according to the second preferred embodiment. In this embodiment, the outlet 3 of the injection device 2 is in fluid communication with the air intake stream or manifold of the engine (not illustrated). The sensor 12 in the embodiment of FIG. 1 is replaced with a pair of sensors 12a and 12b. Sensor 12a measures the engine speed or RPM via an engine alternator sensor (not illustrated). Sensor 12b is a manifold absolute pressure sensor. The sensor 12b is sometimes referred to as an MAP/TP sensor and variations in values of the manifold pressure represent variations in engine load. It will be appreciated that the input from the RPM sensor 12a and MAP/TP sensor 12b each travel at a range from a zero value representing minimum engine RPM or idle and zero load to a maximum value representing maximum engine RPM and maximum load.

A cut out switch 14 is in communication with the controller 8 such that when power to the engine is removed or the throttle is moved to an idle position, the controller 8 automatically shuts off flow through the flow controller 6 as diesel fuel is not being combusted. In this embodiment the natural gas is injected in to the engine air intake manifold and mixed therein and subsequently injected into each cylinder of the engine in turn. The concentration of the natural gas in the air intake stream once it has entered the cylinder prior to combustion with diesel fuel therein is preferably 2.3% but can be anywhere in the range of greater than 0.6% to 3.0% by volume of natural gas.

As shown in FIG. 2, the system 1 operates by receiving inputs 12a and 12b indicative of the engine RPM and manifold pressure respectively. The natural gas is injected in liquid form into the air stream into the engine air intake upstream of an engine cylinder inlet valve to allow the air and natural gas injected to mix. Measuring the percentage of natural gas mixed into the air stream of the engine intake can include bleeding a portion of the mixed natural gas air intake stream and sampling this directly with a natural gas sensor. In other embodiments, the natural gas/air intake mixture can be measured by combusting the bled stream and measuring the products with a time delayed hot wire sensor. Of course, any preferred direct or secondary natural gas concentration sensor can be used as desired.

The natural gas cut out switch 14 can be provided to turn off the natural gas injection when the accelerator/throttle is moved to a rest or home position. Of course, the system 1 is disabled when the engine ignition system is turned off or disengaged. It will be appreciated that the preferred embodiments provides a system 1 that can be "auto-tuned" by the measurement of a single engine RPM value so as to maintain the natural gas concentration in the air intake stream in the cylinder prior to combustion of about 2.3%, as noted below.

It is known that for an engine size of a predetermined literage value volume that the greater the RPM measured the more cycles per second the engine is operating at and more air it is consuming therefore the amount of gas required to maintain an air gas percentage of about 2.3% will increase accordingly. The following characterising equation is used to govern the injection rate of the natural gas in liquid form into the engine 1.

Engine capacity (litres)×RPM×manifold air pressure (psi)×percentage of air intake being natural gas=natural gas injection rate (litres per minute).

As noted, the RPM value of the engine is determined by measuring the alternator tap. The air pressure is provided by the MAP/TP sensor and normal air pressure is approximately 14.7 psi. It is known that the percentage of natural gas in the air intake in the cylinder prior to combustion is most preferably about 2.3%.

Following from this for a known engine volume, the RPM and manifold pressure values can be measured and it can be determined how many litres of air the engine will use every minute. This value is then multiplied by the preferred natural gas concentration of 2.3% which provides the required natural gas injection rate per minute. The only parameter to then know is the engine capacity and the engine RPM and manifold air pressure can be measured at idle (or any other preferred value) from which to calibrate the system 1.

Although not illustrated, the above formula for determining the natural gas injection rates is most preferably modified to include a term on the left hand side of the equation proportional to a measured temperature of the air intake steam to allow for thermal expansion of the liquid gas and air intake stream. Likewise, it will be appreciated that any other preferred sensor inputs can be provided upon which the natural gas injection rate is dependent. These include an oxygen sensor and/or thermistor as desired.

Furthermore, it will be appreciated that the system 1 can determine the natural gas injection rates based on the above equation or some other equation as preferred or a lookup or data table, or indeed any other preferred means as desired. Likewise, the manifold absolute pressure sensor can be replaced by an exhaust temperature sensor, a throttle positioning sensor or an exhaust nitrous oxide gas sensor, or a turbocharger pressure sensor in the case of non-naturally aspirated diesel engines. It will be appreciated that the system 1 can be "auto-tuned" on the basis of a single natural gas injection rate made at a predetermined engine RPM value which may be idle.

Figure 3:
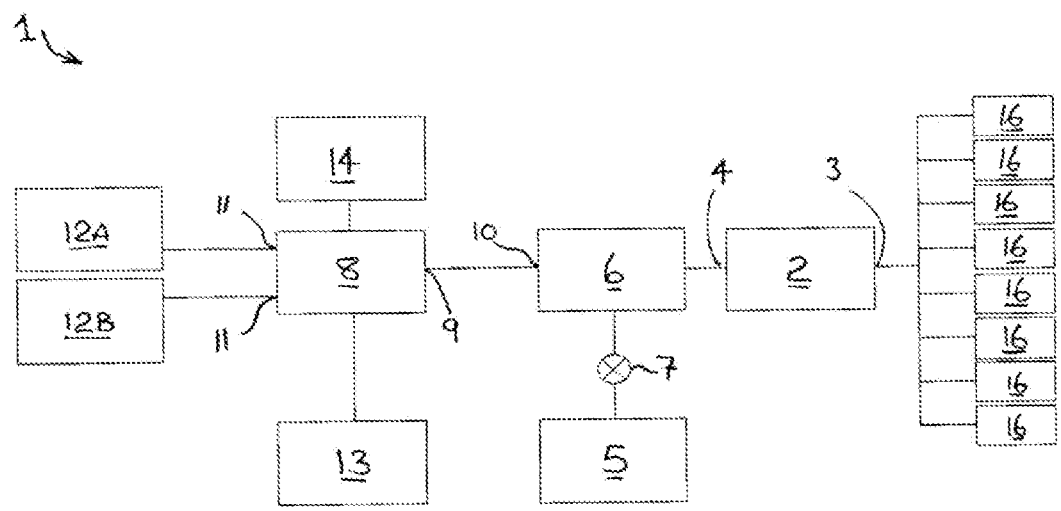
FIG. 3 is a is a block diagram of a system for injecting natural gas in liquid form into the engine manifold or air in-take stream of a diesel fuel engine for combustion with diesel fuel therein according to another preferred embodiment of the invention.

Referring now to FIG. 3, there is shown another preferred embodiment of a system for injecting natural gas in liquid form into diesel fuel engine for natural diesel fuel therein. This embodiment of the system 1 is similar to that of FIG. 2 except that the injection device 2 supports a plurality of injectors 16 each configured to be disposed on or in a diesel engine cylinder so as to inject the natural gas in liquid form directly into the cylinder prior to combustion. The system of FIG. 3 is shown as having eight injectors, one for each cylinder of an eight cylinder diesel engine.

The entry of the natural gas into the cylinder in liquid form advantageously creates a pressure difference reducing the pressure in the cylinder thereby allowing more air to be present in the cylinder prior to combustion with the diesel fuel. Advantageously, the diesel fuel is not only efficiently burnt by the addition of the natural gas at 2.3%, but additional air and hence fuel can be injected into the cylinder simultaneously with or after the natural gas in liquid form due to the pressure reduction created thereby.

In this embodiment, the liquid natural gas is most preferably injected directly into cylinders sequentially in an order corresponding to the cylinder firing. This advantageously allows the liquid natural gas to be directly injected in a controlled manner and timed with the firing of each cylinder.

It will be appreciated that throughout the specification the injecting of natural gas in liquid form is intended to mean that as the natural gas is injected into the air intake stream/manifold, or directly into the cylinders, it is in a liquid form. This relatively quickly vaporises to advantageously reduce the pressure in the air intake stream/manifold or cylinder upon injection.

In this embodiment, the liquid natural gas is most preferably injected directly into cylinders sequentially in an order corresponding to the cylinder firing. This advantageously allows the liquid natural gas to be directly injected in a controlled manner and timed with the firing of each cylinder.

The foregoing describes only preferred embodiments of the present invention and modifications, obvious to those skilled in the art, can be made thereto without departing from the scope of the present invention.

The term "comprising" (and its grammatical variations) as used herein is used in the inclusive sense of "including" or "having" and not in the exclusive sense of "consisting only of".

The invention claimed is:

1. A method of injecting natural gas in liquid form into a diesel fuel engine for combustion with diesel fuel therein, said method comprising:
    injecting said natural gas in liquid form into said engine for combustion therein with said diesel fuel so as to maintain a natural gas concentration in one or more cylinders of said engine prior to combustion,
    said natural gas concentration being maintained greater than 0.6% and less than or equal to 3.0% of air intake by volume of said natural gas.

2. The method of claim 1, further comprising measuring either said concentration of said natural gas injected into said engine or an engine performance parameter; and
    varying the rate of injection of said natural gas into said engine in response to said measuring.

3. The method of claim 1, wherein said injecting said natural gas in liquid form into said engine further comprises either:
    injecting said natural gas in liquid form into an air-intake stream or manifold of said engine upstream of one or more engine cylinders, or
    injecting said natural gas in liquid form directly into one or more said cylinders.

4. The method of claim 3, wherein said natural gas concentration in one or more cylinders of said engine prior to combustion is maintained between 0.8% and 2.8% of air-intake volume.

5. The method of claim 4, wherein said natural gas concentration in one or more cylinders of said engine prior to combustion is maintained at 2.3% of air-intake volume.

6. The method of claim 2, wherein said measuring said concentration of natural gas injected into said engine further comprises:
  bleeding a portion of said air-intake stream of said engine by combusting said natural gas and said bled air-intake mixture; and
  measuring products of the combusting with a time delayed hot wire sensor.

7. The method of claim 1, wherein said liquid natural gas comprises one or more natural gases selected from the group consisting of: methane, a substitute natural gas, and natural gas.

8. The method of claim 1, wherein said injecting said liquid natural gas comprises:
  measuring engine revolutions per minute of said engine ($REVS_{current}$) at engine idle ($REVS_{min}$) to determine a baseline injection rate; and
  injecting said liquid natural gas ($GAS_{inject}$) at a rate of injection comprising said baseline rate plus a predetermined rate proportional to said engine revolution rate ($REVS_{current}$).

9. The method of claim 8, further comprising:
  measuring an air-pressure of a manifold of said engine at engine idle; and
  varying a rate of injection of said natural gas ($GAS_{inject}$) proportionally with said measured air pressure.

10. The method of claim 8, wherein said engine revolutions per minute of said engine is measured via an engine electrical source.

11. The method of claim 9, wherein said air-pressure of said engine manifold is measured via a corresponding measurement of a manifold absolute pressure (MAP) sensor, a turbo charger pressure sensor, a throttle positioning sensor, an exhaust temperature sensor, an exhaust nitrous-oxide gas sensor or a combination of two or more said sensors, or by attaching said engine to a dynamometer.

12. A system for injecting natural gas in liquid form into a diesel fuel engine for combustion with diesel fuel therein, said system comprising:
  a natural gas injection device having an outlet disposed in fluid communication with said engine and an inlet disposed in fluid communication with a liquid natural gas source;
  a natural gas injection device controller configured to receive input indicative of an engine performance parameter and configured to control the rate of injection of said natural gas in liquid form from said natural gas injection device outlet such that said natural gas is present in one or more cylinders of said engine prior to combustion greater than 0.6% and less than or equal to 3.0% of air intake by volume of said natural gas.

13. The system of claim 12, wherein said engine performance parameter comprises one or more engine performance parameters selected from the group consisting of:
  a percentage of natural gas mixed into said air-intake stream in said engine cylinders prior to combustion;
  engine revolutions per minute of said engine;
  a voltage output an engine electrical source;
  engine manifold absolute pressure;
  turbo charger pressure;
  throttle position;
  exhaust temperature;
  exhaust nitrous-oxide gas concentration; and
  an engine dynamometer.

14. The system of claim 12, wherein said natural gas injection device outlet is configured either to inject said liquid natural gas into an air-intake stream or manifold of said engine upstream of one or more engine cylinders, or to inject said natural gas directly Into one or more said cylinders.

15. The system of claim 12, wherein said liquid natural gas comprises one or more natural gases selected from the group consisting of: methane; a substantially methane substitute natural gas in the form of a mixture of one or more combustible gases with air to provide a mixture with substantially the same properties as methane or nature gas.

16. The system of claim 12 configured to perform the method for injecting natural gas in liquid form into the diesel fuel engine of claim 1.

17. A diesel fuel engine modified to operate in accordance with the method of claim 1.

18. A diesel fuel engine comprising the system for injecting natural gas in liquid form into the diesel fuel engine of claim 12.

19. The method of claim 8, wherein said engine electrical source comprises a voltage output of an alternator of said diesel fuel engine.

20. The system of claim 13, wherein said engine electrical source comprises a voltage output of an alternator of said diesel fuel engine.

* * * * *